Figure 1:
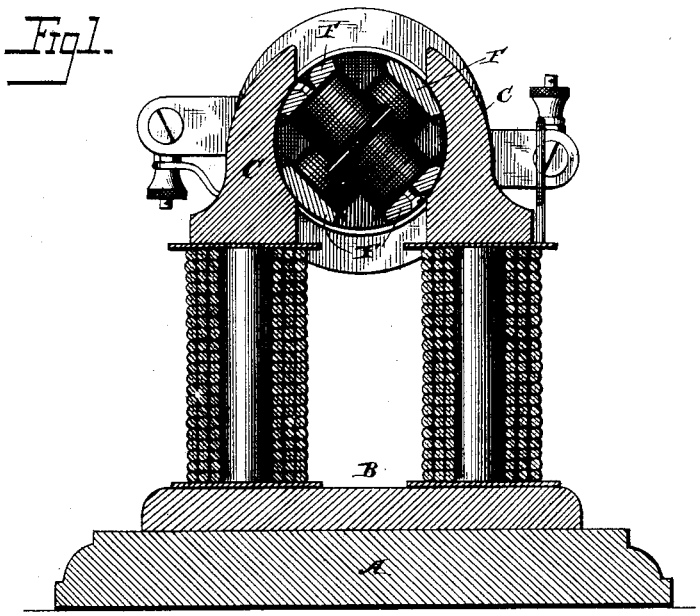

(No Model.) 2 Sheets—Sheet 1.

W. S. HILL.
ELECTRIC MOTOR.

No. 331,880. Patented Dec. 8, 1885.

Attests:
John G. Hinkel Jr.
Wm. F. Sayers

Inventor:
Warren S. Hill
by Foster & Freeman
attys (No Model.) 2 Sheets—Sheet 2.

W. S. HILL.
ELECTRIC MOTOR.

No. 331,880. Patented Dec. 8, 1885.

Attests:
John G. Hinkel Jr.
Wm. J. Sayers.

Inventor:
Warren S. Hill
by
Foster Freeman
attys

UNITED STATES PATENT OFFICE.

WARREN S. HILL, OF BOSTON, MASSACHUSETTS.

ELECTRIC MOTOR.

SPECIFICATION forming part of Letters Patent No. 331,880, dated December 8, 1885.

Application filed April 14, 1885. Serial No. 162,216. (No model.)

*To all whom it may concern:*

Be it known that I, WARREN S. HILL, a citizen of the United States, residing at Boston, Suffolk county, State of Massachusetts, have invented certain new and useful Improvements in Electric Motors, of which the following is a specification.

My invention relates to electric motors, and has for its object to so construct the armature of such motors as to render the attraction of the same by the field-magnets as near as practicable uniform during its entire rotation, and to produce the maximum effect from a given strength of current. This object I attain by so disposing the core-pieces of the armature as to cause all polarized parts of the same to be continuously active, and to cause them to be continuously polarized, as distinguished from those motors in which some portions of the core are only intermittently active, and in which the current magnetizes only intermittently the core or cores.

Generally speaking, the armature of my motor consists of two electro-magnets, each composed of a soft-iron core and two helices thereon, the said magnets crossing each other at right angles, and extended pole-pieces applied to the cores. The circuit is arranged and so controlled by the commutator as to pass the current through all the helices simultaneously without sensible interruption, to produce and maintain two north and two south poles, corresponding to the poles of the field-magnet, and of the same magnetic intensity. Assuming that at starting the armature stands with one magnet substantially in line with the field-magnet poles, and the other magnet consequently at right angles thereto, the current is so directed by the rotation of the commutator as to change the polarities of the magnets from quadrant to quadrant, whereby it becomes necessary in the beginning to maintain the direction of the current unchanged through one magnet during a half of a rotation, while it is changed in the other at the end of a quarter of a rotation, and then maintain the polarization of this second magnet throughout a half-rotation, and to reverse the polarization of the first at the end of the quarter-rotation, and so on continuously. Looking, therefore, at the poles of the magnets of like name, there will be two adjacent north poles, each occupying a quarter-section of the armature, and as the armature rotates through a quadrant the forward north pole is reversed, while the next one remains unchanged, and the succeeding magnet-pole is rendered north by the proper direction of the current through its coils, so that without interruption the north poles embrace one-half of the circumference of the armature. The same operation takes place on the other side of the armature with respect to the south poles.

It is apparent that I may use any multiple of the two magnets, if each additional pair of magnets is controlled in like manner.

For a more particular description of the manner of applying my invention to a motor reference is made to the accompanying drawings, forming part of this specification, in which—

Figure 2:
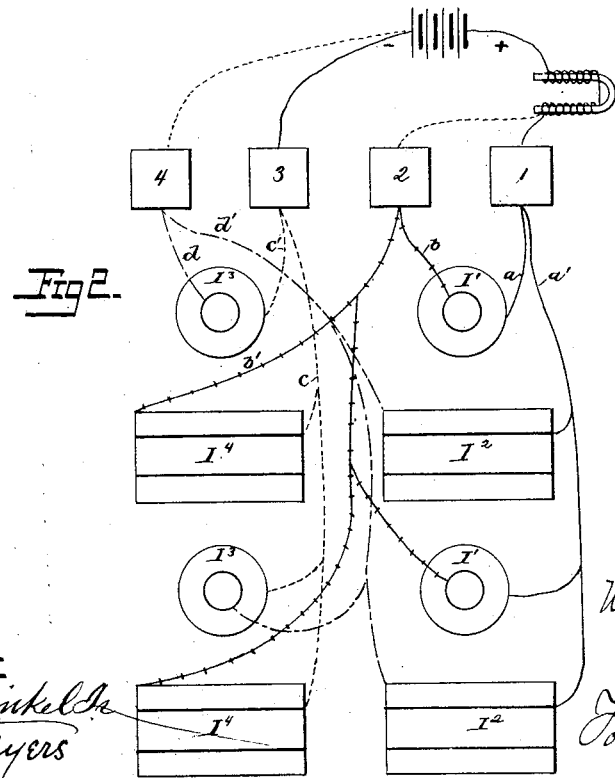
Figure 3:
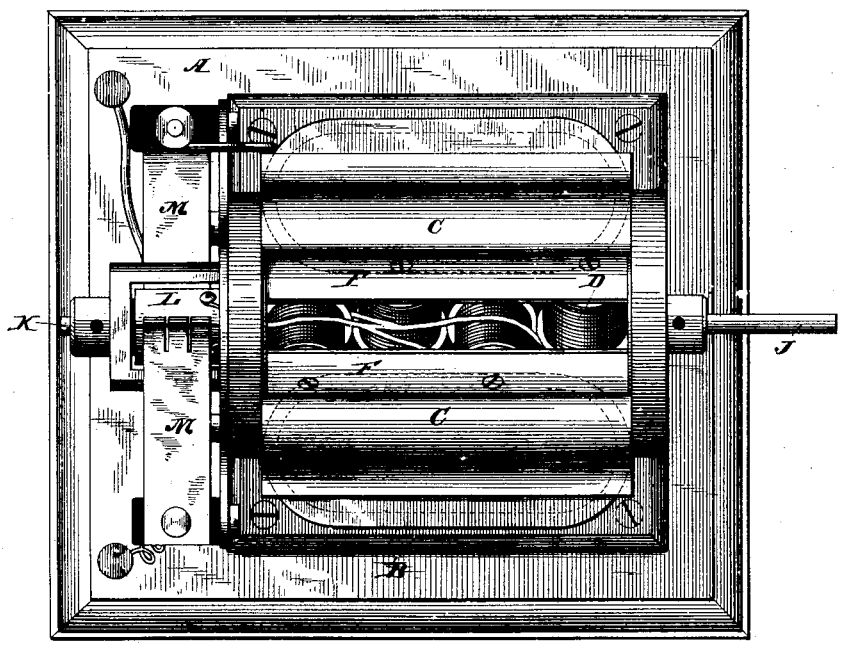
Figure 4:
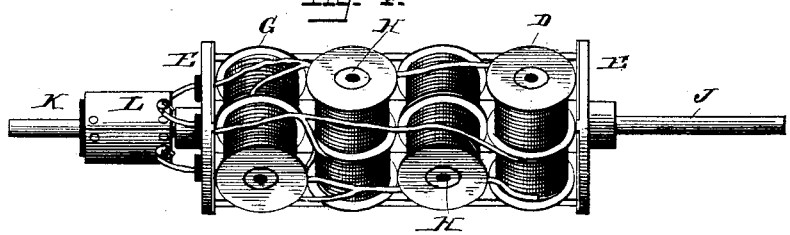
Figure 5:
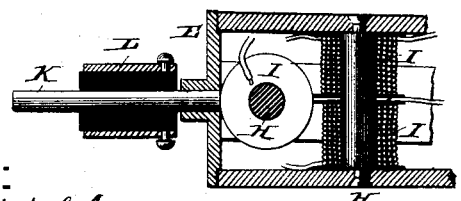

Figure 1 is a transverse section of the motor. Fig. 2 is a diagram illustrating the course of the circuits. Fig. 3 is a plan view. Fig. 4 is a plan view of the armature, two of the pole-pieces being removed to show the magnet. Fig. 5 is a partial section of the armature through one of the magnets.

Upon a suitable base, A, is secured a field-magnet, B, constructed in an ordinary manner, having extended curved pole-pieces C. In the circular opening between the pole-pieces is inserted the armature D, journaled in any suitable manner. The armature consists of two disks, E, of non-magnetic material, joined by four pole-pieces, F, of soft iron, each of which extends through an arc of less than ninety degrees. Between each pair of opposite pole-pieces are placed, parallel to each other, any desired number of magnets, G, each magnet consisting of a soft-iron core, H, secured at its ends to the pole-pieces and carrying two coils or helices, I. Thus a series of magnets, where each succeeding magnet crosses the preceding one at right angles, is produced.

Secured to the outer sides of the disks E, by collars or otherwise, are the sectional shafts J K, the latter carrying the commutator L, consisting of four segmental pieces of conducting material suitably insulated from each other and the shaft. Brushes M, suitably secured in place, bear upon the diametrical opposite segments of the commutator, and are connected with the circuit of the field-magnets in a manner well understood, so that the incoming current from the generator will pass through the coils of the field-magnet, thence to one of the brushes M, thence through the armature-coils, and out by the other brush. The course of the current through the armature-coils is represented diagrammatically in Fig. 2, in which 1 2 3 4 represent the segments of the commutator, and $I'$, $I^2$, $I^3$, and $I^4$ the coils or helices upon the magnets G, $I'$ and $I^3$ representing the two coils upon the core of one magnet, and $I^2$ and $I^4$ the coils upon the core of the next succeeding magnet at right angles to the first. Supposing the brushes to bear upon the commutator-plates 1 and 3, the circuit will be as follows: From the positive pole of the generator through the coils of the field-magnet to plate 1; thence by conductor $a$ to the coil $I'$, and through said coil in such direction as to produce in its core a positive pole at its outer end; thence by conductor $b$ to the plate 2; thence by conductor $b'$ to coil $I^4$, and through the same in a direction to produce a positive pole at its outer end, and thence by conductor $c$ to the plate 3 and to the generator. At the same time a branch circuit, $a'$, passes to the coil $I^2$, and through the same in a direction to produce at its outer end a negative pole; thence by conductor $d'$ to plate 4; thence by conductor $d$ to coil $I^3$, in and through the same, producing a negative pole at its outer end, and thence by conductor $c'$ to plate 3 and to generator. From this it will be seen that the current from the generator passes through all the coils in two branches, those in one branch producing positive poles at the outer ends of the magnets, the two pole-pieces of which are adjacent to each other and embrace two contiguous quadrants of the armature, and those in the other branch producing negative poles of like extent. If, now, as the armature rotates the brushes are caused to pass from the plates 1 and 3 onto the plates 2 and 4, respectively, as indicated in dotted lines, the circuit may be traced as follows: Entering at plate 2, it passes by conductor $b$ to the coil $I'$ in such a direction as to reverse the outer pole thereof, making it negative. The polarity of the magnet-pole is indicated in the diagram by the leading-in conductor extending either to the inner or outer end of the coil. From the outer end of coil $I'$ the circuit is through conductor $a$ to plate 1; thence by conductor $a'$ to coil $I^2$, and through the same in the same direction as before, producing again a negative pole; thence out by conductor $d'$ to plate 4 and to generator. A branch at the same time passes from plate 2, by conductor $b'$, to and through coil $I^4$, producing a positive pole at its outer end, as before; thence by conductor $c$ to plate 3, and by conductor $c'$ to and through coil $I^3$, reversing the same and producing a positive pole, and thence by conductor $d$ to plate 4 and generator. It will thus be observed that the direction of the current through coils $I^2$ and $I^4$ has not been changed, but through $I'$ and $I^3$ it has been changed, so that while in the first instance the pole-pieces of coils $I'$ and $I^2$ were positive and of coils $I^3$ and $I^4$ were negative, now the pole-pieces of $I^2$ and $I^3$ are positive and those of $I'$ and $I^4$ are negative. The polarity of the armature has thus shifted through one quadrant, and it is clear, without further description, that at each passage of the brushes from one plate to another a like change takes place and the diametric polarization of the armature progresses one quadrant, and that all the coils are continuously energized and are acted upon by the field-magnet.

The circuits have been described with reference to only one pair of magnets; but two pairs are shown in the diagram and the circuits indicated, so that they may be easily traced, and it is evident that any multiple of two magnets may be connected in a like manner.

It is evident that my invention may be used as a generator as well as a motor.

What I claim is—

1. A rotary armature of an electric motor, consisting of one or more pairs of electro-magnets crossing each other at right angles, each magnet being provided with two separate coils, and commutators and circuit-connections, substantially as described, whereby the magnetic axis of the armature is shifted by quadrants and the coils are united in closed circuit, substantially as described.

2. A rotary armature of an electric motor, consisting, essentially, of one or more pairs of electro-magnets crossing each other at right angles, each magnet being provided with two coils, a commutator, and branch connection to each magnet from each segment of the commutator, whereby all the coils are simultaneously energized and the magnetic axis of the armature is shifted by quadrants, substantially as described.

3. A rotary armature of an electric motor, consisting of two electro-magnets or multiples thereof, four pole-pieces therefor, each constituting a quadrant of the armature, a commutator, and multiple-arc circuits from the sections of the commutator to the coils of the magnets, whereby all the pole-pieces are continuously and uniformly energized, substantially as described.

4. An armature for an electric motor, consisting of two or more magnet-cores crossing each other at right angles, pole-pieces secured to the outer ends of the magnet-cores and united at their ends to disks, substantially as described.

In testimony whereof I have signed my name to this specification in the presence of two subscribing witnesses.

WARREN S. HILL.

Witnesses:
FREDERICK A. P. FISKE,
THOS. W. PROCTOR.